United States Patent
Jumonji et al.

(10) Patent No.: US 11,482,020 B2
(45) Date of Patent: Oct. 25, 2022

(54) LOOKING AWAY DETERMINATION DEVICE, LOOKING AWAY DETERMINATION SYSTEM, LOOKING AWAY DETERMINATION METHOD, AND STORAGE MEDIUM

(71) Applicant: NEC CORPORATION, Tokyo (JP)

(72) Inventors: Nana Jumonji, Tokyo (JP); Kazuki Inagaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/040,682

(22) PCT Filed: Mar. 25, 2019

(86) PCT No.: PCT/JP2019/012400
§ 371 (c)(1),
(2) Date: Sep. 23, 2020

(87) PCT Pub. No.: WO2019/188926
PCT Pub. Date: Oct. 3, 2019

(65) Prior Publication Data
US 2021/0056331 A1 Feb. 25, 2021

(30) Foreign Application Priority Data
Mar. 27, 2018 (JP) .............................. JP2018-059162

(51) Int. Cl.
*G06V 20/59* (2022.01)
*G06V 40/16* (2022.01)
*B60Q 9/00* (2006.01)

(52) U.S. Cl.
CPC .......... *G06V 20/597* (2022.01); *G06V 40/161* (2022.01); *B60Q 9/00* (2013.01)

(58) Field of Classification Search
CPC .......... G06K 9/00845; G06K 9/00228; B60W 40/09; B60W 2540/225; G06T 2207/30201; G06T 7/97
See application file for complete search history.

(56) References Cited

U.S. PATENT DOCUMENTS

2003/0125855 A1* 7/2003 Breed ................... G06V 40/10
 701/36
2005/0125351 A1* 6/2005 Tidwell ................ G06Q 20/40
 705/42

(Continued)

FOREIGN PATENT DOCUMENTS

JP 2002-008020 A 1/2002
JP 2007-018249 A 1/2007

(Continued)

OTHER PUBLICATIONS

International search report for PCT/JP2019/012400 dated Jun. 11, 2019.

*Primary Examiner* — Md K Talukder
(74) *Attorney, Agent, or Firm* — Sughrue Mion, PLLC

(57) ABSTRACT

A looking away determination device includes: a looking away determination unit that determines that a driver is in a looking away state when a proportion of an image in which a face having a degree of certainty equal to or greater than a threshold value is shown with respect to a plurality of images obtained by imaging the driver, the degree of certainty serving as an index of face likeness; and an updating unit that updates the threshold value based on a degree of certainty of a face shown in an image obtained by imaging the driver.

9 Claims, 7 Drawing Sheets

(56) References Cited

U.S. PATENT DOCUMENTS

| | | | |
|---|---|---|---|
| 2013/0207805 A1* | 8/2013 | Inada | B60Q 5/005 340/576 |
| 2015/0154461 A1* | 6/2015 | Kitaura | G06V 20/597 348/148 |
| 2016/0180068 A1* | 6/2016 | Das | H04L 63/0861 726/7 |
| 2017/0004354 A1* | 1/2017 | Noridomi | G06V 20/597 |
| 2018/0307896 A1* | 10/2018 | Tamura | G06T 7/11 |
| 2020/0082157 A1* | 3/2020 | Susskind | G06V 40/171 |
| 2020/0105016 A1* | 4/2020 | Yamada | G06V 40/193 |
| 2021/0056331 A1* | 2/2021 | Sakuma | G06V 20/597 |
| 2021/0081690 A1* | 3/2021 | Inagaki | G06T 7/97 |

FOREIGN PATENT DOCUMENTS

| | | |
|---|---|---|
| JP | 2008-187532 A | 8/2008 |
| JP | 3166475 U | 3/2011 |
| WO | 2016/052507 A1 | 4/2016 |

\* cited by examiner

LOOKING AWAY DETERMINATION DEVICE, LOOKING AWAY DETERMINATION SYSTEM, LOOKING AWAY DETERMINATION METHOD, AND STORAGE MEDIUM

CROSS-REFERENCE TO RELATED APPLICATIONS

This application is a National Stage of International Application No. PCT/JP2019/012400 filed Mar. 25, 2019, which claims priority under U.S.C. § 119(a) to Japanese Patent Application No. JP2018-059162 filed on Mar. 27, 2018.

TECHNICAL FIELD

The present invention relates to a looking away determination device, a looking away determination system, a looking away determination method, and a storage medium.

BACKGROUND ART

Patent Document 1 discloses a technique for detecting looking away of a driver operating a moving body such as an automobile.

PRIOR ART DOCUMENTS

Patent Documents

[Patent Document 1] PCT International Publication No. WO 2016/052507

SUMMARY OF THE INVENTION

Problem to be Solved by the Invention

In the above-described technique for determining looking away during driving, looking away detection is performed on the basis of the line of sight direction of the face that appears in a captured image. However, when a face does not appear in the captured image, looking away determination is not performed at all. It is therefore required to appropriately perform looking away determination according to the driving state even if a face does not appear.

An example object of the present invention is to provide a looking away determination device, a looking away determination system, a looking away determination method, and a storage medium that solves the aforementioned issue.

Means for Solving the Problem

According to a first example aspect of the present invention, a looking away determination device includes: a looking away determination unit that determines that a driver is in a looking away state when a proportion of an image in which a face having a degree of certainty equal to or greater than a threshold value is shown with respect to a plurality of images obtained by imaging the driver, the degree of certainty serving as an index of face likeness; and an updating unit that updates the threshold value based on a degree of certainty of a face shown in an image obtained by imaging the driver.

According to a second example aspect of the present invention, a looking away determination system includes an imaging device and a looking away determination device. The looking away determination device includes: a looking away determination unit that determines that a driver is in a looking away state when a proportion of an image in which a face having a degree of certainty equal to or greater than a threshold value is shown with respect to a plurality of images obtained by imaging the driver by the imaging device, the degree of certainty serving as an index of face likeness; and an updating unit that updates the threshold value based on a degree of certainty of a face shown in an image obtained by imaging the driver.

According to a third example aspect of the present invention, a looking away determination method includes: determining that a driver is in a looking away state when a proportion of an image in which a face having a degree of certainty equal to or greater than a threshold value is shown with respect to a plurality of images obtained by imaging the driver, the degree of certainty serving as an index of face likeness; and updating the threshold value based on a degree of certainty of a face shown in an image obtained by imaging the driver.

According to a fourth example aspect of the present invention, a storage medium stores a program that causes a computer to execute: determining that a driver is in a looking away state when a proportion of an image in which a face having a degree of certainty equal to or greater than a threshold value is shown with respect to a plurality of images obtained by imaging the driver, the degree of certainty serving as an index of face likeness; and updating the threshold value based on a degree of certainty of a face shown in an image obtained by imaging the driver.

Effect of the Invention

According to an example embodiment of the present invention, it is possible to determine whether or not a driver is looking away in accordance with the driving state when it is determined that a face is not shown on the basis of a captured image.

EXAMPLE EMBODIMENT

Hereinbelow, a looking away determination device according to exemplary example embodiments of the present invention will be described with reference to the drawings.

Figure 1:
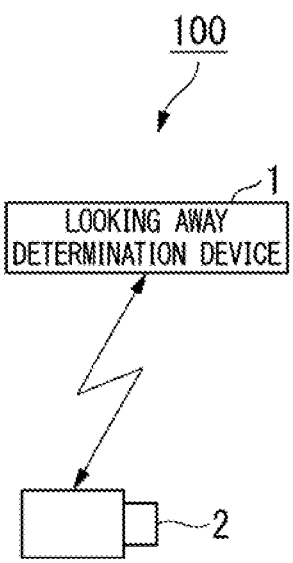
FIG. 1 is a diagram showing a driving state monitoring system according to an example embodiment of the present invention.

FIG. 1 is a diagram showing a driving state monitoring system (looking away determination system) according to an example embodiment of the present invention.

As shown in FIG. 1, a driving state monitoring system 100 includes a looking away determination device 1 and a drive recorder 2 that is one form of a driving state sensing device. The looking away determination device 1 and the drive recorder 2 are connected via a wireless communication network or a wired communication network. The drive recorder 2 is provided in a vehicle as an example. The looking away determination device 1 is communicatively connected to the drive recorders 2 respectively installed in a plurality of vehicles that are running throughout a city.

Figure 2:
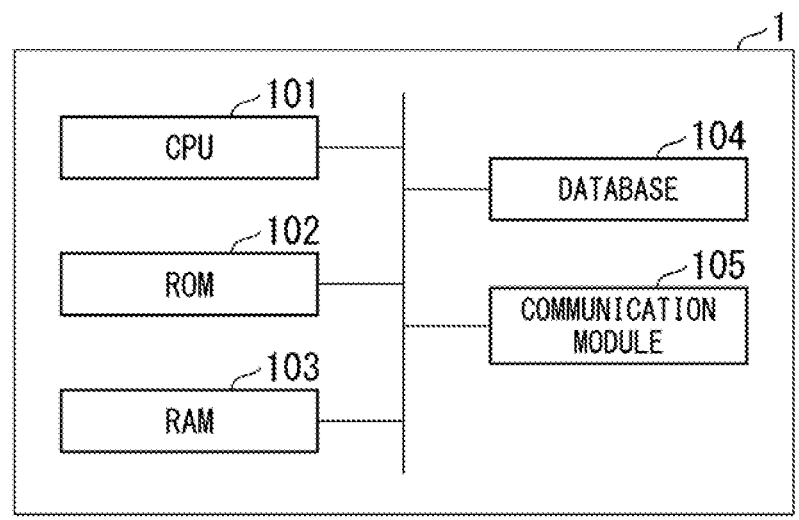
FIG. 2 is a hardware configuration diagram of a looking away determination device according to the example embodiment of the present invention.

FIG. 2 is a hardware configuration diagram of the looking away determination device 1.

As shown in FIG. 2, the looking away determination device 1 is a computer including hardware such as a CPU (Central Processing Unit) 101, a ROM (Read Only Memory) 102, a RAM (Random Access Memory) 103, a database 104, and a communication module 105.

Figure 3:
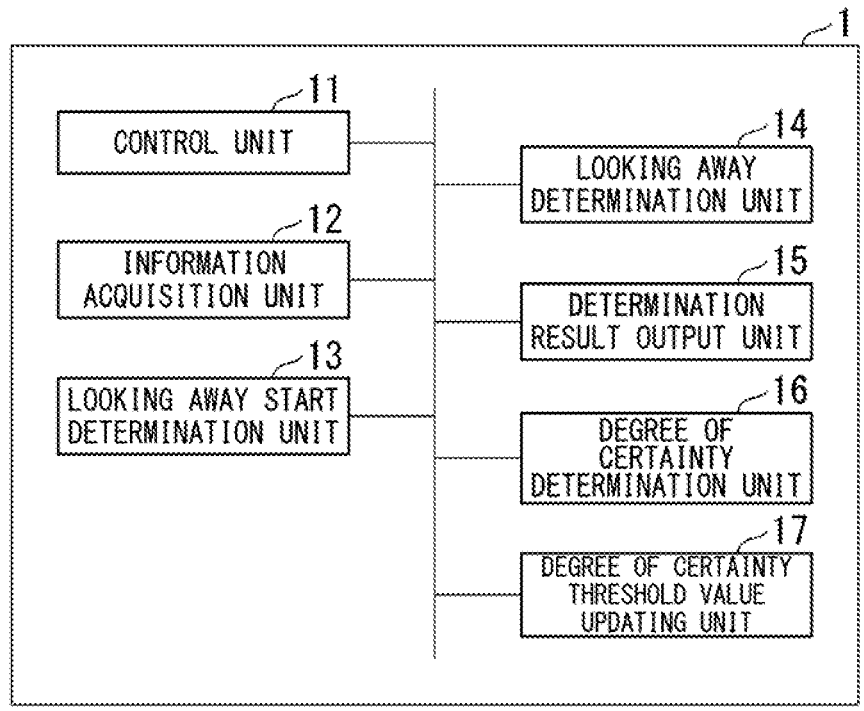
FIG. 3 is a function block diagram of the looking away determination device according to the example embodiment of the present invention.

FIG. 3 is a function block diagram of the looking away determination device 1.

The looking away determination device 1 is activated when the power is turned on, and executes a looking away determination program stored in advance. Thereby, the looking away determination device 1 exhibits at least the functions of a control unit 11, an information acquisition unit 12, a looking away start determination unit 13, a looking away determination unit 14, a determination result output unit 15, a degree of certainty determination unit 16, and a degree of certainty threshold value updating unit 17.

The control unit 11 controls other function units.

The information acquisition unit 12 acquires information transmitted from the drive recorder 2, such as captured images, vehicle information, weather information, and acceleration information.

The looking away start determination unit 13 determines whether to start looking away determination.

The looking away determination unit 14 determines that there is a looking away state when the time during which a face cannot be detected is equal to or greater than a predetermined proportion per unit time. Moreover, the looking away determination unit 14 determines that there is a looking away state when the time during which the facial direction is not within a predetermined condition range is equal to or greater than a predetermined proportion per unit time. Moreover, the looking away determination unit 14 determines that there is a looking away state when the time during which the facial direction is not within a predetermined condition range is equal to or greater than a predetermined proportion per unit time. Moreover, the looking away determination unit 14 determines that there is a looking away state when the time during which the degree of certainty of a face appearing in a captured image is not equal to or greater than a degree of certainty threshold value is equal to or greater than a predetermined proportion per unit time.

The determination result output unit 15 outputs the looking away determination result.

The degree of certainty determination unit 16 determines whether or not a degree of certainty, serving as an index of face-likeness, of a face appearing in a captured image that has been acquired is equal to or greater than the degree of certainty threshold value.

The degree of certainty threshold value updating unit 17 updates the degree of certainty threshold value on the basis of the degree of certainty of a face appearing in the captured image. The degree of certainty threshold value updating unit 17 updates the degree of certainty threshold value on the basis of a deviation between the statistical value of the degree of certainty of a face appearing in a captured image acquired during the time between the current time and a past time up to a predetermined time with the current time serving as a standard, and the degree of certainty of a face in a newly acquired captured image. The degree of certainty threshold value updating unit 17 reduces the value of the degree of certainty threshold value when there is a state in which the degree of certainty of a face appearing in the captured image is less than the degree of certainty threshold value and calculation of a degree of certainty equal to or greater than the degree of certainty threshold value of each face appearing in a series of captured images received from the image capture device that transmitted captured images cannot perform, and the statistical value of the degree of certainty of a face appearing in a captured image acquired during the time between the current time and a past time up to a predetermined time with the current time serving as a standard is equal to or greater than a lower limit value of the degree of certainty threshold value. The degree of certainty threshold value updating unit 17 updates the degree of certainty threshold value to a lower limit value when there is a state in which the degree of certainty of a face appearing in the captured image is less than the degree of certainty threshold value and calculation of a degree of certainty equal to or greater than the degree of certainty threshold value of each face appearing in a series of captured images received from the image capture device that transmitted captured images cannot perform, and the statistical value of the degree of certainty of a face appearing in a captured image acquired during the time between the current time and a past time up to a predetermined time with the current time serving as a standard is less than the lower limit value of the degree of certainty threshold value. Moreover, the degree of certainty threshold value updating unit 17 increases the value of the current degree of certainty threshold value when the degree of certainty of a face appearing in a captured image is equal to or greater than the degree of certainty threshold value and the statistical value of the degree of certainty of a face appearing in captured images acquired during the time between the current time and a past time up to a predetermined time with the current time serving as a standard is higher than the value of the current degree of certainty threshold value. The degree of certainty threshold value updating unit 17 stops the change of the value of the current degree of certainty threshold value when the degree of certainty of a face appearing in a captured image is equal to or greater than the degree of certainty threshold value and the statistical value of the degree of certainty of a face appearing in captured images acquired during the time between the current time and a past time up to a predetermined time with the current time serving as a standard is lower than the value of the current degree of certainty threshold value.

Figure 4:
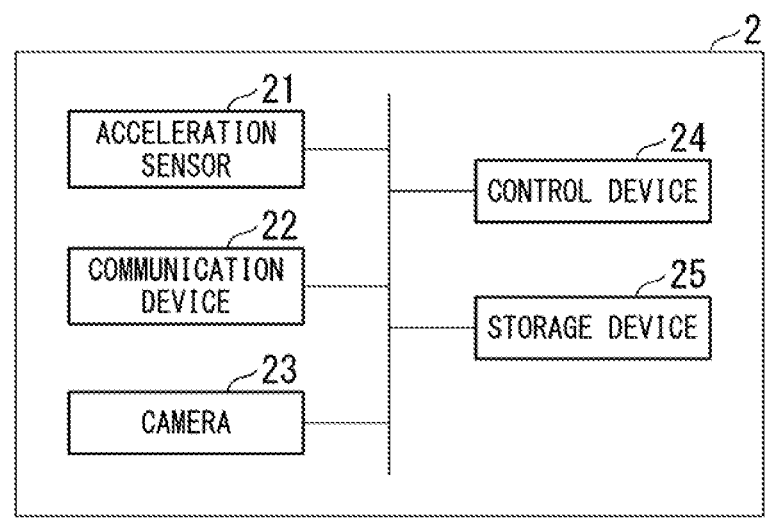
FIG. 4 is diagram showing a hardware configuration of a drive recorder according to the example embodiment of the present invention.

FIG. 4 is a diagram showing a hardware configuration of the drive recorder 2.

The drive recorder 2 includes an acceleration sensor 21, a communication device 22, a camera 23, a control device 24, and a storage device 25. The acceleration sensor 21 detects the acceleration of the vehicle. The communication device 22 is communicatively connected to the looking away determination device 1. The camera 23 captures images of the outside or the inside of the vehicle to generate moving images and still images.

The control device 24 controls each function of the drive recorder 2. The storage device 25 stores moving images, still images, acceleration detected by the acceleration sensor 21, other information obtained from outside the drive recorder 2, and the like. The drive recorder 2 is communicatively connected to the looking away determination device 1 via a base station or the like. The control device 24 of the drive recorder 2 is a computer including a CPU, ROM, RAM and the like.

Figure 5:
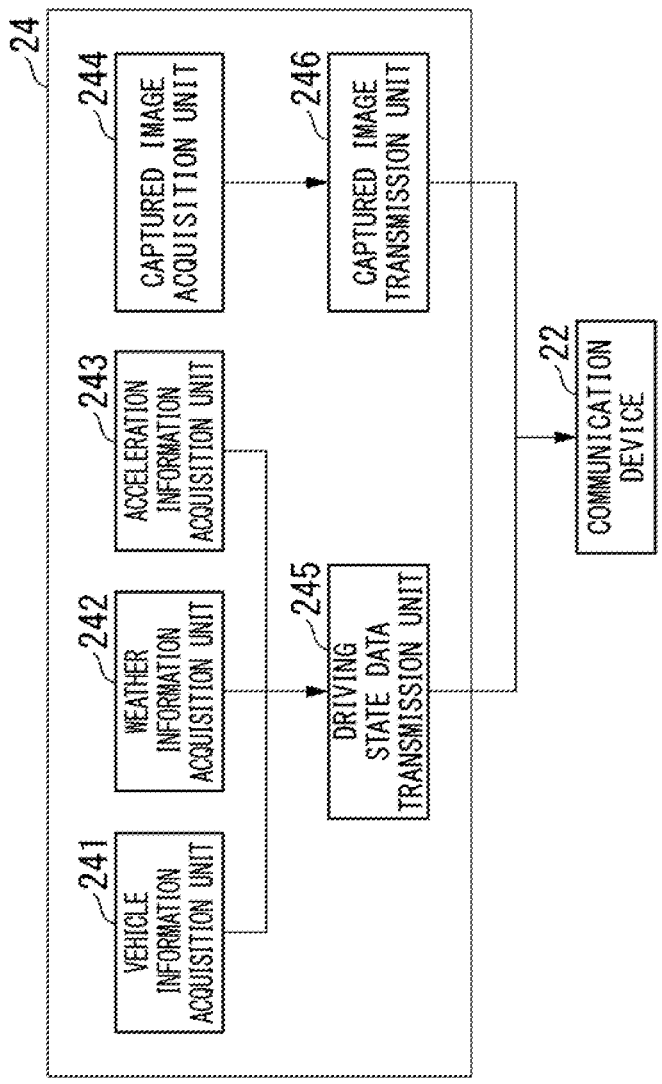
FIG. 5 is a function block diagram of a control device of the drive recorder according to the example embodiment of the present invention.

FIG. 5 is a function block diagram of the control device 24 provided in the drive recorder 2.

The control device 24 executes the control program when the drive recorder starts up. As a result, the control device 24 is capable of functioning as a vehicle information acquisition unit 241, a weather information acquisition unit 242, an acceleration information acquisition unit 243, a captured image acquisition unit 244, a driving state data transmission unit 245, and a captured image transmission unit 246.

Figure 6:
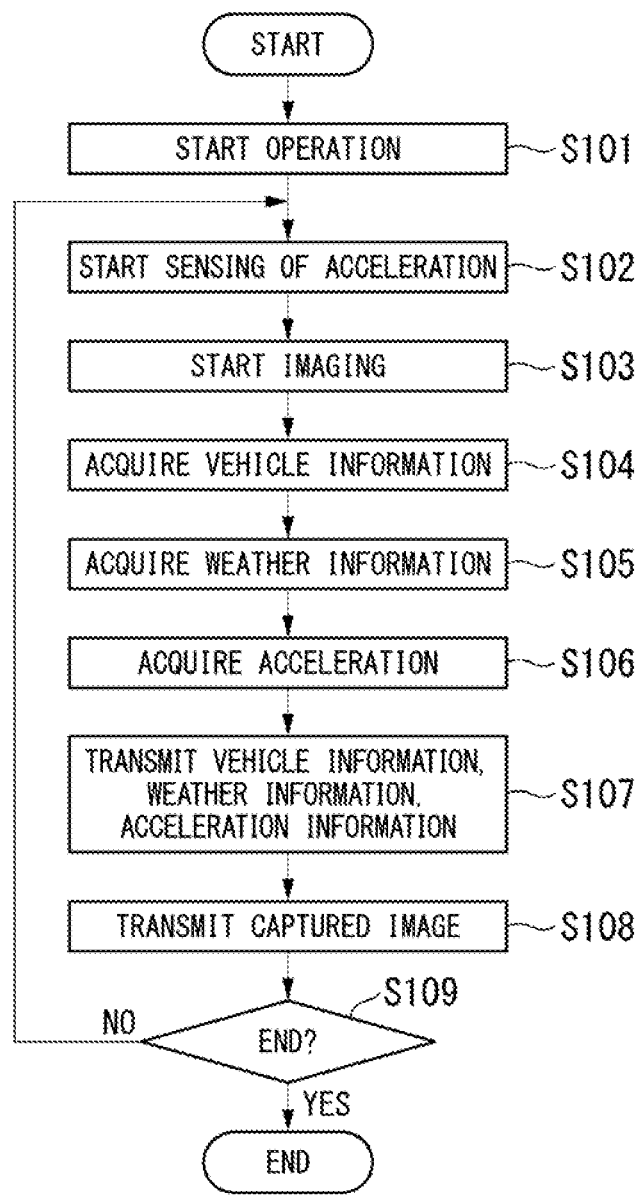
FIG. 6 is a diagram showing the processing flow of the drive recorder according to the example embodiment of the present invention.

FIG. 6 is a diagram showing the processing flow of the drive recorder 2.

Next, the processing flow of the driving state monitoring system 100 will be explained step by step.

First, the transmission process for the driving state information in the drive recorder 2 will be described.

When the electrical system of the vehicle is activated, the drive recorder 2 commences operation (Step S101). The acceleration sensor 21 of the drive recorder 2 starts sensing acceleration of the vehicle after the drive recorder 2 is started (Step S102). Further, the camera 23 starts imaging the inside of the vehicle and the outside of the vehicle (Step S103). The camera 23 includes a vehicle inside lens and a vehicle outside lens. The camera 23 uses the vehicle inside lens to capture an image of an object in the direction toward the driver's face in the vehicle (a rearward scene in the traveling direction (including the driver's face)). The camera 23 uses the vehicle outside lens to capture an image of an object in the traveling direction outside the vehicle.

Then, during operation of the drive recorder 2, the vehicle information acquisition unit 241 of the control device 24 acquires vehicle information (Step S104). The vehicle information acquired by the vehicle information acquisition unit 241 may be the vehicle speed, steering wheel angle, turn indicator direction, and the like detected by each sensor provided in the vehicle. The weather information acquisition unit 242 acquires weather information (Step S105). The weather information may be information obtained from a sensor (wiper operation detector or raindrop detector) provided in the vehicle. The control device 24 may determine that the weather is rainy when the wiper is operating or when the raindrop detector detects raindrops. The weather information acquisition unit 242 may acquire the weather information from a server device provided in the Meteorological Agency or a weather information provider. In this case, the weather information acquisition unit 242 may acquire from the server device, as the weather information, information on the weather provided by the Meteorological Agency or a weather information providing company. The weather information acquisition unit 242 may acquire, as the weather information, information obtained from a sensor provided in the vehicle or the like from the server device. The drive recorder 2 may supply imaging data to the server device, the server device may extract weather information by image analysis using the imaging data, and the weather information acquisition unit 242 may acquire that weather information from the server device. The acceleration information acquisition unit 243 acquires acceleration from the acceleration sensor 21 at predetermined time intervals (Step S106). The control device 24 acquires vehicle information, weather information, and acceleration at predetermined intervals.

The driving state data transmission unit 245 instructs the communication device 22 to transmit the vehicle information, the weather information, and the acceleration information to the looking away determination device 1 at predetermined intervals. The communication device 22 transmits the vehicle information, weather information, and acceleration information to the looking away determination device 1 (Step S107). The captured image transmission unit 246 instructs the communication device 22 to transmit captured images to the looking away determination device 1. The communication device 22 transmits the captured images to the looking away determination device 1 (Step S108). The control device 24 determines whether the processing is ended (Step S109), and repeats the processing from Step S102 until the processing is ended. The vehicle information, the weather information, the acceleration information, and the captured images may be provided with the ID of the drive recorder 2, the ID of the driver, and the sensing time (the time when the drive recorder 2 performed image capture). In the aforementioned process, the acceleration and weather information are transmitted. However, when looking away determination is performed based only on the vehicle information, such information need not be transmitted.

Figure 7:
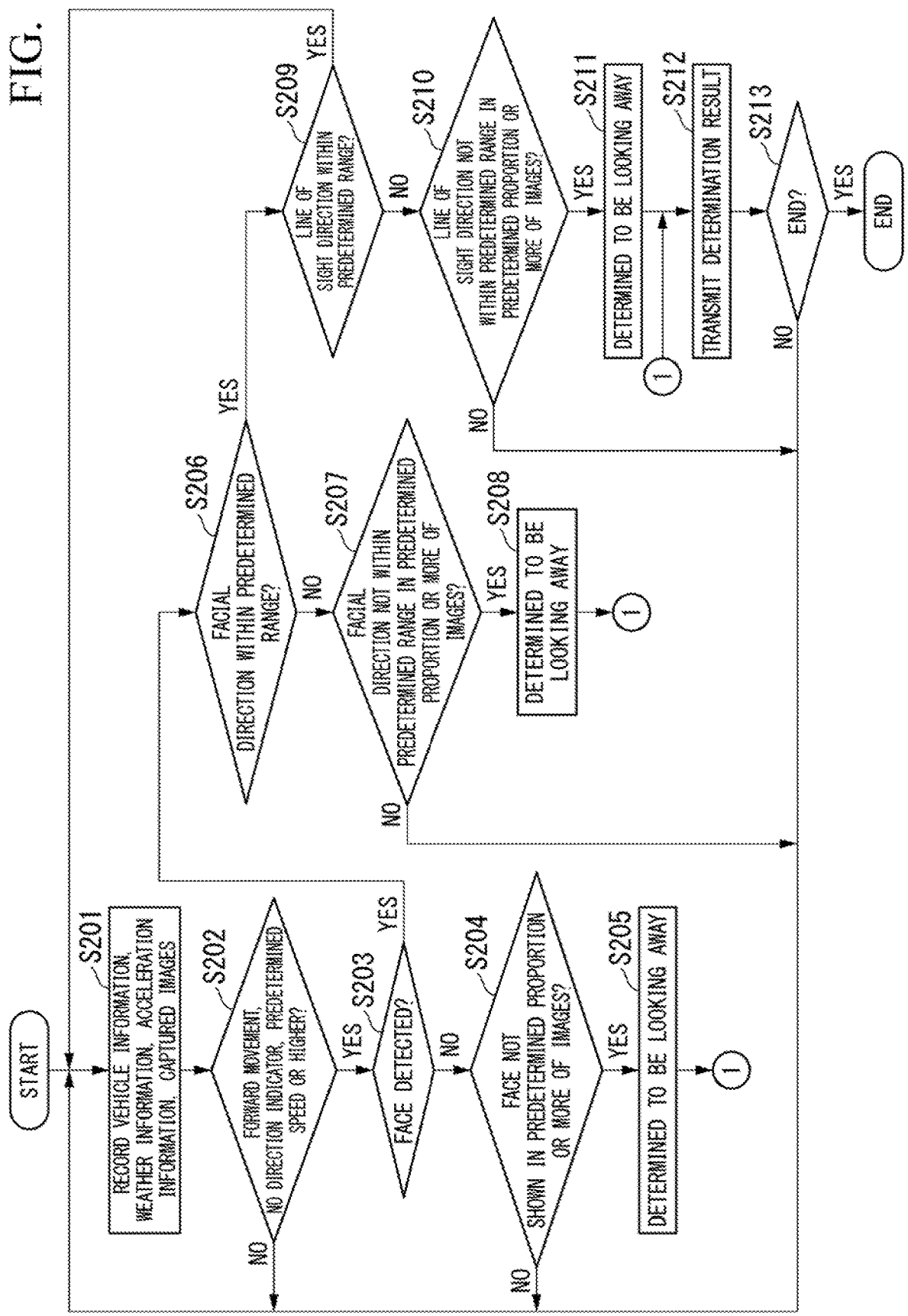
FIG. 7 is a first diagram showing the processing flow of the looking away determination device according to the example embodiment of the present invention.

FIG. 7 is a first diagram showing the processing flow of the looking away determination device 1.

In the looking away determination device 1, on the basis of the ID of the drive recorder 2 or the ID of the driver, the information acquisition unit 12 successively records in the database 104 a set of the corresponding vehicle information, weather information, acceleration information, and captured images in association with each ID (Step S201). Then, the control unit 11 instructs the looking away start determination unit 13 and the looking away determination unit 14 to perform the looking away determination process.

The looking away start determination unit 13 specifies one drive recorder 2 and acquires the sensing time, vehicle information, weather information, acceleration information, and captured images that are recorded in association with that ID. The looking away determination unit 14 determines whether the vehicle speed included in the vehicle information indicates a speed in the forward direction (forward movement), the turn signal indicator direction is not specifying a direction instruction, and the vehicle speed is at a predetermined speed or higher (Step S202). The predetermined speed may be a value such as 20 km/h, for example. The looking away determination unit 14 makes a decision to start the looking away determination when the vehicle speed indicates forward movement, a turn signal indicator is not being designated, and the vehicle is at or above the predetermined speed.

The looking away start determination unit 13 may decide to start the looking away determination by using other information or by additionally using other information. For example, the looking away determination unit 14 may determine whether the acceleration is zero (0) or more, and may decide to start the looking away determination when the acceleration is zero (0) or more. Moreover, the looking away determination unit 14 may decide to start the looking away determination depending on whether the steering wheel angle is within a predetermined range. The predetermined range of the steering wheel angle may be, for example, 10 degrees to the left and right with the straight-ahead direction serving as a standard. Moreover, the looking away determination unit 14 may decide to start the looking away determination when the weather information indicates rain. The looking away determination unit 14 may decide to start the looking away determination based on a captured image outside the vehicle. For example, when an object appears in the straight-ahead direction of the captured image, or when a curve appears in the lane in the captured image, a decision to start the looking away determination may be made. When the looking away determination unit 14 makes the decision to start the looking away determination, the looking away determination unit 14 instructs the start. The looking away determination unit 14 repeats the process of determining whether to start the looking away determination at predetermined intervals.

On the basis of the ID of the drive recorder 2 that is the current processing target, the looking away determination unit 14 receives captured images that have already been acquired by the information acquisition unit 12, from that information acquisition unit 12. Upon having made the decision to start the looking away determination, the looking away determination unit 14 successively reads captured images received from the drive recorder 2 at predetermined intervals.

When reading a captured image, the looking away determination unit 14 performs face detection processing to determine whether a face is shown in the captured image to an extent allowing the continuation of looking away determination. The looking away determination unit 14 determines whether a face can be detected in the newly acquired captured image (Step S203). When the degree of certainty of a face appearing in the captured image is equal to or greater than a degree of certainty threshold value, the looking away determination unit 14 can detect a face in the captured image. When the degree of certainty of a face appearing in the captured image is less than a degree of certainty threshold value, the looking away determination unit 14 cannot detect a face in the captured image. That is, the looking away determination unit 14 determines that a face has been detected when the degree of certainty of a face appearing in the captured image is equal to or greater than the degree of certainty threshold value. The looking away determination unit 14 determines that a face has not been detected when the degree of certainty of a face appearing in the captured image is less than the degree of certainty threshold value. Upon having detected a face in the newly acquired captured image, the looking away determination unit 14 performs the following facial direction detection process. When the looking away determination unit 14 cannot detect a face in the newly acquired captured image, for captured images with a sensing time up to a past predetermined period with the sensing time of the newly acquired captured image serving as a standard, the looking away determination unit 14 determines whether a face does not appear in captured images of a predetermined proportion or more (whether or not the degree of certainty of a face appearing in the captured images is equal to or greater than the degree of certainty threshold value) (Step S204). That is, for captured images with sensing times in a past predetermined period, the looking away determination unit 14 determines whether or not the proportion of images showing a face with a degree of certainty equal to or greater than the threshold value is equal to or greater than a predetermined value. The looking away determination unit 14 determines the driver to be looking away when, for captured images acquired during a predetermined period (for example, 1 second), a face does not appear in a predetermined proportion (for example, 50 percent) or more of the images (Step S205). For the captured images acquired during the predetermined period, if the proportion of images not showing a face is less than the predetermined value, the looking away determination unit 14 does not determine that the driver is looking away, and returns to the process of determining whether to start the looking away determination. For example, the looking away determination unit 14 may determine that the degree of certainty of a face appearing in a captured image is less than the degree of certainty threshold value when an eye cannot be detected from the captured image.

In the above-described face detection process, when the driver is wearing glasses or a mask, the looking away determination unit 14 may determine that a face does not appear in the captured images to an extent allowing continuation of looking away determination. In this case, the looking away determination unit 14 may determine to end the process.

In the facial direction detection processing, the looking away determination unit 14 determines whether the facial direction in a newly acquired captured image is within a predetermined range (facial direction condition range) with the straight-ahead direction serving as a standard (Step S206). The predetermined range may be a range of 10 degrees to the left or right with the straight-ahead direction serving as a standard. The looking away determination unit 14 may change the width of the predetermined range based on the current vehicle speed. For example, when the speed is low, the driver is more likely to view a wide range. For this reason, the looking away determination unit 14 may broaden the predetermined range (width) such as to 20 degrees to the left and right with the straight-ahead direction serving as a standard. When the facial direction in the newly acquired captured image is within the predetermined range, the looking away determination unit 14 performs a line of sight direction detection process. When the facial direction in the newly acquired captured image is not within the predetermined range, the looking away determination unit 14 acquires a looking away determination result for images captured up to a predetermined period in the past (for example, 1 second) with the sensing time of the newly acquired captured image serving as a standard. With regard to those determination results, the looking away determination unit 14 determines whether the proportion of captured images in which the facial direction is within a predetermined range with the straight-ahead direction serving as a standard is equal to or greater than a predetermined value (for example, 50%) (Step S207). The looking away determination unit 14 determines that the driver is looking away when, for captured images acquired during the predetermined period, the proportion of captured images in which the facial direction is within a predetermined range with the straight-ahead direction serving as a standard is not equal to or greater than the predetermined value (Step S208). The looking away determination unit 14 may change the predetermined value in the process of determining whether the proportion of captured images in which the facial direction is within the predetermined range with the straight-ahead direction serving as a standard is the predetermined value or greater. For example, the looking away determination unit 14 decreases the value of the predetermined value as the vehicle speed decreases. Here, when the speed of the vehicle is low, the driver is likely to view a wide area. In such a case, by lowering the value of the predetermined value, even if the driver is viewing a wide area, the driver will not be judged as looking away. For this reason, it is possible to reduce the output of excessive looking away alerts to the driver.

In the line of sight direction detection processing, the looking away determination unit 14 determines whether the line of sight direction in a newly acquired captured image is within a predetermined range (line of sight direction condition range) based on the straight-ahead direction (Step S209). The predetermined range may be a range of 10 degrees to the left or right with the straight-ahead direction serving as a standard. When the speed of the vehicle is low in the looking away determination unit 14, the driver is likely to view a wide area. For this reason, it may broaden the predetermined range (width) such as to 20 degrees to the left and right with the straight-ahead direction serving as a standard. When the line of sight direction of the face shown in the newly acquired captured image is within the predetermined range, the looking away determination unit 14 does not determine the driver to be looking away, and returns to the processing for determining whether to start looking away determination. When the line of sight direction of the face shown in the newly acquired captured image is not within the predetermined range, the looking away determination unit 14 acquires looking away determination results for images captured up to a predetermined period in the past (for example, 1 second) with the sensing time of the newly acquired captured image serving as a standard. With regard to those determination results, the looking away determination unit 14 determines whether or not the proportion of captured images in which the line of sight of the driver is within the predetermined range with the straight-ahead direction serving as a standard is equal to or greater than a predetermined value (for example, 50%) (Step S210). The looking away determination unit 14 determines the driver to be looking away when the proportion of captured images in which the line of sight of the driver is within the predetermined range with the straight-ahead direction serving as a standard in the captured images acquired during the predetermined period is not equal to or greater than the predetermined value (Step S211). The looking away determination unit 14 may change the predetermined value in the process of determining whether the proportion of captured images in which the line of sight of the driver is within the predetermined range with the straight-ahead direction serving as a standard is the predetermined value or greater. For example, the looking away determination unit 14 decreases the predetermined value as the vehicle speed decreases. Here, as described above, when the speed of the vehicle is low, the possibility that the driver is viewing a wide area is high. In such a case, even if the driver views a wide area, the driver will not be judged as looking away. As a result, it is possible to reduce the output of excessive looking away alerts to the driver.

Upon having determined that looking away is being performed, the looking away determination unit 14 instructs the determination result output unit 15 to output a looking away determination result. The determination result output unit 15 acquires the ID of the drive recorder 2 associated with the data used when a determination is made that looking away is being performed. The determination result output unit 15 acquires the network address that is the transmission destination from the database 104 on the basis of the ID of the drive recorder 2. The network address of the transmission destination is recorded in the database 104 in advance. The determination result output unit 15 transmits information indicating looking away detection to the transmission destination (Step S212). The determination result output unit 15 may record information indicating the looking away detection in the database 104 in association with the ID of the drive recorder 2 or the ID of the driver. The looking away determination unit 14 determines whether to end the process (Step S213). If the process is not ended, the looking away determination device 1 then repeats the same process at predetermined intervals using the processing received from the drive recorder 2.

The drive recorder 2 receives information indicating that looking away by the driver has been detected. Upon receiving the information of looking away detection, the drive recorder 2 performs a process of notifying the driver of the looking away detection, such as issuing an alarm sound. This enables the driver to become aware of the looking away driving.

Figure 8:
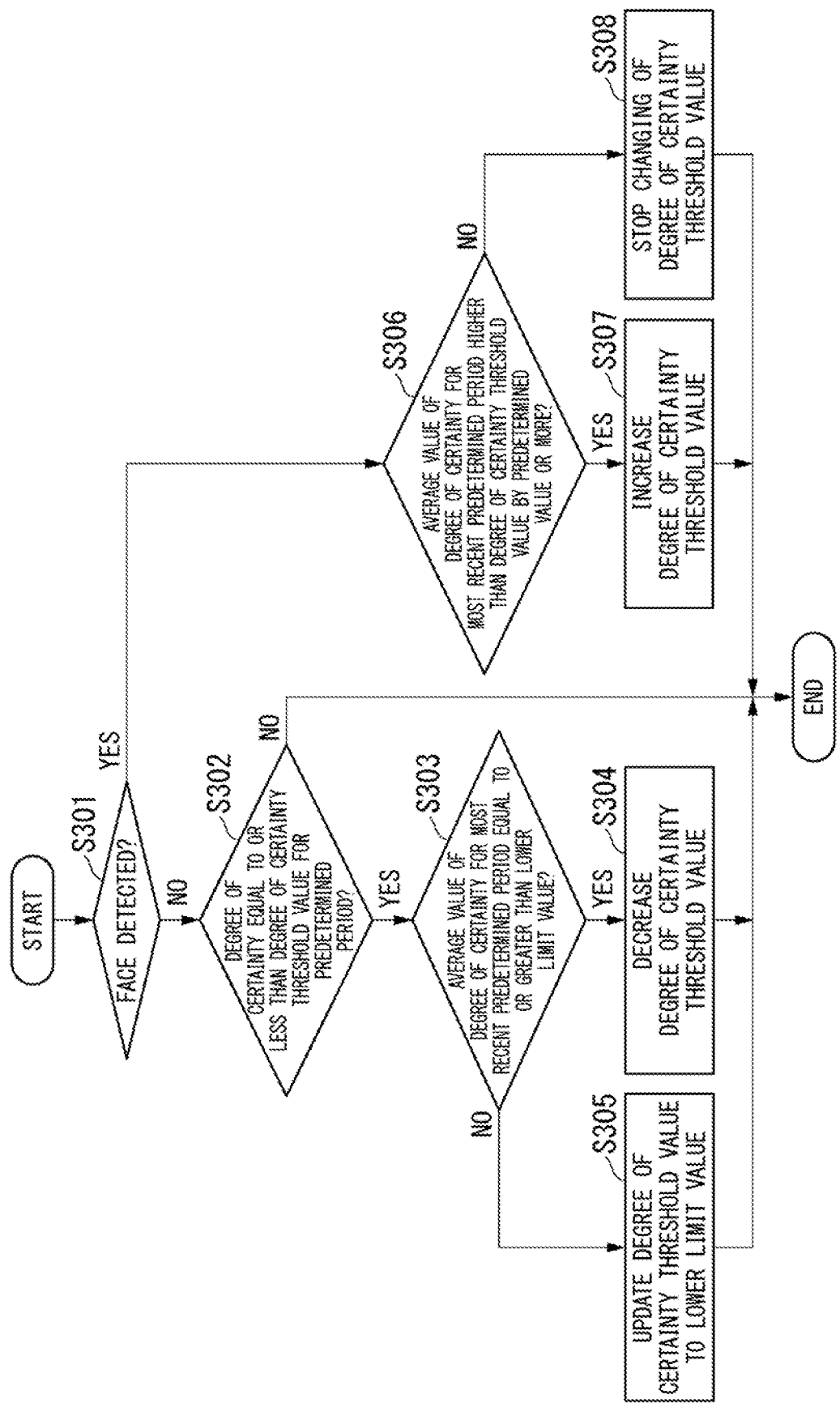
FIG. 8 is a second diagram showing the processing flow of the looking away determination device according to the example embodiment of the present invention.

FIG. 8 is a second diagram showing the processing flow of the looking away determination device 1.

In the looking away determination detection device 1, the degree of certainty determination unit 16 calculates the degree of certainty of a face appearing in the captured image by the face detection processing in Step S203 described above, and determines whether the calculated degree of certainty is equal to or higher than the degree of certainty threshold value. Thereby, the degree of certainty determination unit 16 determines whether a face can be detected in the captured image (Step S301). That is, the degree of certainty determination unit 16 determines whether a face is detected in the captured image. The degree of certainty is a value (for example, in units of percent) that is an index of face-likeness. The higher the degree of certainty value, the higher the degree of certainty of face detection. If the degree of certainty value is low, the degree of certainty of face detection is low. Therefore, the degree of certainty determination unit 16 detects that there is a face in the captured image when the degree of certainty of a face in the captured image is greater than or equal to the degree of certainty threshold value. On the other hand, the degree of certainty determination unit 16 does not detect that there is a face in the captured image when the degree of certainty of a face in the captured image is lower than the degree of certainty threshold value.

The degree of certainty threshold value updating unit 17 executes a degree of certainty threshold value updating process for updating the degree of certainty threshold value on the basis of the degree of certainty of a face appearing in a captured image, in parallel with the above-mentioned looking away determination process. The degree of certainty threshold value updating unit 17 performs the degree of certainty threshold value increase updating process when a face has been detected in the degree of certainty threshold value updating process. On the other hand, when a face cannot be detected in the degree of certainty threshold value updating process, the degree of certainty threshold value updating unit 17 performs a process of lowering and updating the next degree of certainty threshold value.

In the process of lowering and updating the degree of certainty threshold value, the degree of certainty threshold value updating unit 17 determines whether or not there is a state in which the degree of certainty of a face appearing in the series of captured images received from the drive recorder 2 is not equal to or greater than the degree of certainty threshold value (Step S302). For example, the degree of certainty threshold value updating unit 17 determines there to be a state in which the degree of certainty of a face appearing in the series of captured images is not equal to or greater than the degree of certainty threshold value when the state of the degree of certainty being equal to or less than the degree of certainty threshold value has continued for a predetermined time or more after the start of the looking away determination process, or when the state in which the degree of certainty up to a predetermined period in the past with the sensing time of the newly acquired captured image serving as a standard is equal to or less than the degree of certainty threshold value is continuing. The degree of certainty threshold value updating unit 17 ends the process when the degree of certainty of a face appearing in the series of captured images is equal to or greater than the degree of certainty threshold value.

In the case of the state in which the degree of certainty of a face appearing in the series of captured images is not equal to or greater than the degree of certainty threshold value, the degree of certainty threshold value updating unit 17 determines whether the average value (statistical value) of the degree of certainty of a face appearing in a captured image acquired in the time between the sensing time (current time) of the newly acquired captured image and a past time up to a predetermined time with the sensing time serving as a standard is equal to or greater than the lower limit value of the degree of certainty threshold value (Step S303).

The degree of certainty threshold value updating unit 17 lowers the value of the current degree of certainty threshold value when the average value of the degree of certainty is equal to or greater than the lower limit of the degree of certainty threshold value (Step S304). For example, the degree of certainty threshold value updating unit 17 reduces the value of the degree of certainty threshold value to the average value of the calculated degree of certainty. Alternatively, when the calculated average value of the degree of certainty does not become a value less than the lower limit value of the new degree of certainty threshold value, the degree of certainty threshold value updating unit 17 may use, as a new value, a value obtained by subtracting a predetermined value or a predetermined proportion from the current degree of certainty threshold value. The threshold value updating unit 17 updates the value of the degree of certainty threshold value to the lower limit value when the average value of the degree of certainty is less than the lower limit value of the degree of certainty threshold value (Step S305).

When a face has been detected in Step S301, the degree of certainty threshold value updating unit 17 performs a process of increasing and updating the degree of certainty threshold value. In this process, the degree of certainty threshold value updating unit 17 determines whether the average value of the degree of certainty of a face appearing in captured images acquired in the time between the sensing time of the newly acquired captured image (current time) and a past time up to a predetermined time with the sensing time serving as a standard is higher than the value of the current degree of certainty threshold value by a predetermined value or more (Step S306). Here, the predetermined time for calculating the average degree of certainty value may be different from the predetermined time for calculating the average degree of certainty value in Step S303, or may be the same time.

When the average value of the degree of certainty is higher than the current degree of certainty threshold value by a predetermined value or more, the degree of certainty threshold value updating unit 17 increases the current degree of certainty threshold value (Step S307). For example, the degree of certainty threshold value updating unit 17 updates the degree of certainty threshold value to the average value of the degree of certainty that has been calculated. Alternatively, if the new degree of certainty threshold value becomes greater than the current degree of certainty threshold value, the degree of certainty threshold value updating unit 17 may use a value obtained by subtracting a predetermined value from the average value of degree of certainty that has been calculated as the degree of certainty threshold value.

If the average value of the degree of certainty is lower than the current degree of certainty threshold value, the degree of certainty threshold value updating unit 17 stops changing the value of the current degree of certainty threshold value (Step S308). That is, the degree of certainty threshold value updating unit 17 does not change the degree of certainty threshold value when the average value of degree of certainty is lower than the current degree of certainty threshold value.

In the above process, the looking away determination device 1 connected to a communication network as a cloud server performs looking away determination. However, the drive recorder 2 may independently perform the above-described process of looking away determination. That is, the drive recorder 2 may operate as the looking away determination device 1. In this case, the drive recorder 2 may exhibit the same functions as the above-mentioned information acquisition unit 12, the looking away start determination unit 13, the looking away determination unit 14, the determination result output unit 15, the degree of certainty determination unit 16, and the degree of certainty threshold value updating unit 17. Alternatively, a vehicle-mounted device mounted in the vehicle and connected to the drive recorder 2 may exhibit the same functions as the information acquisition unit 12, the looking away start determination unit 13, the looking away determination unit 14, the determination result output unit 15, the degree of certainty determination unit 16, and the degree of certainty threshold value updating unit 17. In this case, the vehicle-mounted device operates as the looking away determination device 1.

According to the above-mentioned process, even if the facial direction or the line of sight direction cannot be detected, it is possible to detect looking away of the driver depending on whether or not the face can be detected.

In addition, the above-described process outputs an alert when the facial direction or line of sight direction has shifted by a predetermined proportion in a predetermined period, without presenting an alert indicating that looking away has been detected just by a slight deviation in the facial direction or line of sight direction. Thereby, it is possible to reduce the output of unnecessary looking away detection alerts to the driver.

In addition, the above-described looking away determination device 1 avoids determining the driver as looking away in a state where the line of sight direction deviates from the forward direction, in the case of driving at a speed equal to or lower than a predetermined speed, such as driving at a low speed. Thereby, it is possible to reduce the output of unnecessary looking away detection alerts to the driver.

In addition, the above-described looking away determination device 1 performs a process of broadening the range with the straight-ahead direction serving as a standard for the case where it is determined that there is a possibility of a looking away determination, in response to a decrease in the speed of the vehicle. For that reason, it is possible to perform looking away determination based on an appropriate range of the facial direction or the line of sight direction according to the speed.

In addition, according to the above-described process, in the process of determining whether the proportion of images in which the line of sight is within the predetermined range with the straight-ahead direction serving as a standard is equal to or greater than a predetermined proportion, the looking away determination device 1 lowers the value of that predetermined proportion as the speed decreases. Thereby, it is possible to perform looking away determination based on an appropriate range of the facial direction or the line of sight direction according to the speed.

Further, according to the above-described processing, the looking away determination device 1 can automatically adjust the degree of certainty threshold value (threshold value) that is a condition for face detection in accordance with the driver's state. For example, the looking away determination device 1 can facilitate face detection by reducing the degree of certainty threshold value when a face has not been detected even once after the looking away determination process has been started, or when no face has been detected for a predetermined time or longer. As a result, even if the driver is wearing glasses or a mask whereby face detection is in an adverse condition, it is possible to accurately perform looking away determination. Further, the looking away determination device 1 can prevent unnecessary reduction in the accuracy of looking away determination by automatically increasing the degree of certainty threshold value when the driver's face detection rate is high or improved.

Figure 9:
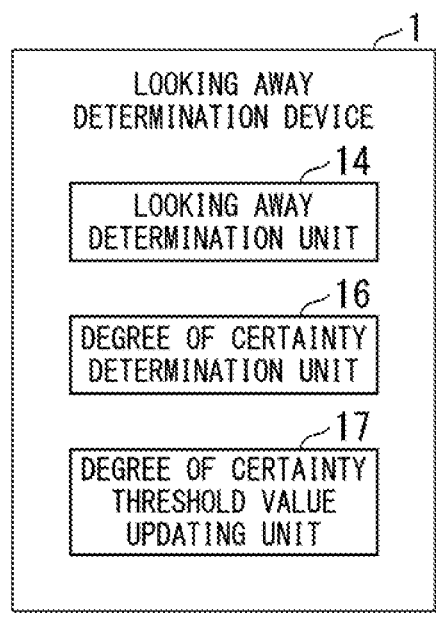
FIG. 9 is a diagram showing the constituting of a looking away determination device according to another example embodiment of the present invention.

FIG. 9 is a diagram showing a configuration of the looking away determination device according to another example embodiment of the present invention.

The looking away determination device 1 need only to include at least the looking away determination unit 14, the degree of certainty determination unit 16, and the degree of certainty threshold value updating unit 17. The degree of certainty determination unit 16 determines whether or not a degree of certainty, serving as an index of face-likeness, of a face appearing in a captured image is equal to or greater than the degree of certainty threshold value. The looking away determination unit 14 determines there to be looking away when the time during which the degree of certainty of a face appearing in a captured image is not equal to or greater than the degree of certainty threshold value is equal to or greater than a predetermined proportion per unit time. The degree of certainty threshold value updating unit 17 updates the degree of certainty threshold value on the basis of the degree of certainty of a face appearing in the captured image.

The looking away determination device 1 and the drive recorder 2 described above have a computer system inside. The process of each process described above is stored in a computer-readable recording medium in the form of a program, with the above process being performed by the computer reading and executing the program. Here, the computer-readable recording medium refers to a magnetic disk, a magneto-optical disk, a CD-ROM, a DVD-ROM, a semiconductor memory, or the like. Further, the computer program may be distributed to a computer via a communication line, and the computer that receives the distribution may execute the program.

Also, the above program may be for realizing some of the functions described above. Further, the program may be a so-called differential file (differential program) that can realize the functions described above in combination with a program already recorded in the computer system.

This application is based upon and claims the benefit of priority from Japanese Patent Application No. 2018-59162, filed Mar. 27, 2018, the disclosure of which is incorporated herein in its entirety.

INDUSTRIAL APPLICABILITY

The present invention may be applied to a looking away determination device, a looking away determination system, a looking away determination method, and a storage medium.

REFERENCE SYMBOLS

1: Looking away determination device
2: Drive recorder
11: Control unit
12: Information acquisition unit
13: Looking away start determination unit
14: Looking away determination unit
15: Determination result output unit
16: Degree of certainty determination unit
17: Degree of certainty threshold value updating unit
21: Acceleration sensor
23: Camera
24: Control device
241: Vehicle information acquisition unit
242: Weather information acquisition unit
243: Acceleration information acquisition unit
244: Captured image acquisition unit
245: Driving state data transmission unit
246: Captured image transmission unit

The invention claimed is:

1. A looking away determination device comprising:
a memory configured to store instructions; and
a processor configured to execute the instructions to:
 calculate a proportion of an image in which a face having a degree of certainty equal to or greater than a threshold value is not shown with respect to a plurality of images obtained by imaging a driver at a plurality of different timings, the degree of certainty serving as an index of face likeness;
 determine that the driver is in a looking away state when the calculated proportion is equal to or greater than a predetermined value; and
 update the threshold value based on a degree of certainty of a face shown in an image obtained by imaging the driver,
wherein updating comprises updating the threshold value based on a statistical value of a degree of certainty of a face shown in a plurality of images captured in a period from a time before a current time to the current time, and
wherein updating the threshold value based on the statistical value comprises reducing the threshold value when the degree of certainty of the face shown in the obtained image is less than the threshold value, a degree of certainty of each face shown in a series of images is less than the threshold value, and the statistical value is equal to or greater than a lower limit value of the threshold value, the series of images being received from a camera that has transmitted the obtained image.

2. The looking away determination device according to claim 1, wherein the processor is configured to execute the instructions to: determine whether a face having a degree of certainty equal to or greater than the threshold value is shown in the image obtained by imaging the driver.

3. The looking away determination device according to claim 1, wherein updating the threshold value based on the statistical value comprises updating the threshold value to a lower limit value of the threshold value when the degree of certainty of the face shown in the obtained image is less than the threshold value, the degree of certainty of each face shown in the series of images is less than the threshold value, and the statistical value is less than the lower limit value.

4. The looking away determination device according to claim 1, wherein updating the threshold value based on the statistical value comprises increasing the threshold value when the degree of certainty of the face shown in the obtained image is equal to or greater than the threshold value and the statistical value is greater than the threshold value.

5. The looking away determination device according to claim 1, wherein updating the threshold value based on the statistical value comprises not changing the threshold value when the degree of certainty of the face shown in the obtained image is equal to or greater than the threshold value and the statistical value is lower than the threshold value.

6. A looking away determination system comprising:
the looking away determination device according to claim 1; and
the camera that obtains the plurality of images by imaging.

7. A looking away determination method comprising:
calculating a proportion of an image in which a face having a degree of certainty equal to or greater than a threshold value is not shown with respect to a plurality of images obtained by imaging a driver at a plurality of different timings, the degree of certainty serving as an index of face likeness;
determining that the driver is in a looking away state when the calculated proportion is equal to or greater than a predetermined value; and
updating the threshold value based on a degree of certainty of a face shown in an image obtained by imaging the driver,
wherein updating comprises updating the threshold value based on a statistical value of a degree of certainty of a face shown in a plurality of images captured in a period from a time before a current time to the current time, and
wherein updating the threshold value based on the statistical value comprises reducing the threshold value when the degree of certainty of the face shown in the obtained image is less than the threshold value, a degree of certainty of each face shown in a series of images is less than the threshold value, and the statistical value is equal to or greater than a lower limit value of the threshold value, the series of images being received from a camera that has transmitted the obtained image.

8. A non-transitory computer-readable storage medium that stores a program that causes a computer to execute:
calculating a proportion of an image in which a face having a degree of certainty equal to or greater than a threshold value is not shown with respect to a plurality of images obtained by imaging a driver at a plurality of different timings, the degree of certainty serving as an index of face likeness;
determining that the driver is in a looking away state when the calculated proportion is equal to or greater than a predetermined value; and
updating the threshold value based on a degree of certainty of a face shown in an image obtained by imaging the driver,
wherein updating comprises updating the threshold value based on a statistical value of a degree of certainty of a face shown in a plurality of images captured in a period from a time before a current time to the current time, and wherein updating the threshold value based on the statistical value comprises reducing the threshold value when the degree of certainty of the face shown in the obtained image is less than the threshold value, a degree of certainty of each face shown in a series of images is less than the threshold value, and the statistical value is equal to or greater than a lower limit value of the threshold value, the series of images being received from a camera that has transmitted the obtained image.

9. The looking away determination device according to claim 1, wherein updating the threshold value based on the degree of certainty of the face is executed in parallel with the determining.

* * * * *